United States Patent Office 3,205,084
Patented Sept. 7, 1965

3,205,084
PROCESS FOR MAKING NITRIDIZED TITANIUM FLAKE PIGMENT
Oscar J. C. Klein, Westfield, Edward F. Klenke, Jr., Summit, and Charles W. Manger, Irvington, N.J., assignors to E. I. du Pont de Nemours and Company, Wilmington, Del., a corporation of Delaware
No Drawing. Filed Apr. 18, 1962, Ser. No. 188,514
6 Claims. (Cl. 106—291)

This invention relates to a novel, golden-colored flake pigment, to processes whereby it can be produced, and to liquid coating compositions in which it is dispersed. The invention is more particularly directed to said pigment comprising discrete flakes having a thickness of from 0.1 to 3.0 microns and consisting essentially of nitridized titanium flakes containing from 12 to 20% by weight of chemically combined nitrogen, is further particularly directed to said processes comprising the steps of (1) effecting contact between nitrogen gas and titanium flakes having a thickness of 0.1 to 3.0 microns while maintaining the temperature in the range from 1000 to 1100° C., whereby nitridation of the titanium by the nitrogen occurs, and (2) continuing said contact until the flakes contain from 12 to 22.6% by weight of chemically combined nitrogen, and is still further directed to coating compositions comprising a dispersion of the pigment in a liquid, film-forming vehicle.

The color of titanium nitride has been reported as brown (J. W. Mellor, "Comprehensive Treatise on Inorganic and Theoretical Chemistry," vol. 8, p. 119, line 14), "a dark violet-blue powder or coppery looking mass resembling sublimed indigo" (ibid., lines 23 and 24), red in reflected and green in transmitted light (ibid., line 30), bronze red (Handbook of Chemistry and Physics, 24th ed., Chemical Rubber Publishing Co., p. 513), brilliant yellow or blue, green, or red (Becket, U.S. Patent 976,337). Various methods for producing titanium nitride have been proposed, but none which involved direct nitridation of titanium metal flakes with gaseous nitrogen under controlled conditions.

One method recently proposed for making a titanium nitride suitable for pigment use is that of U.S. patent application Serial No. 636,250, filed January 25, 1957, by Donald O. Niederhauser, now U.S. Patent 3,032,397. According to this method an adduct of titanium tetrahalide with ammonia or an ammonium halide is heated and vaporized at a temperature of 175 to 400° C. under a pressure of less than 100 mm. and immediately contacted with the surface of a solid substrate which is heated to a temperature of 550 to 950° C., whereby titanium nitride is formed as a coating on the solid substrate. This coating can be removed as golden-colored flakes by scraping it off or treating it with hydrofluoric acid. From the nature of the process by which the flakes are made it is clear that they consist of titanium nitride, there being no opportunity for unreacted titanium or a deficiency of nitrogen to be present in the product.

When the high-temperature nitridation of titanium with nitrogen gas is attempted the results are unpredictable. The reaction is violently exothermic, and even when one starts with a thin, agitated layer of titanium powder and passes nitrogen gas over it at reaction temperatures, products of various colors are likely to be obtained. In no event has a golden-colored pigment been prepared in this way; neither has the method been capable of producing a flake pigment. Furthermore, in all of the processes hereinabove discussed the objective has been to produce a product consisting essentially of titanium nitride, and there has been no conception that less than complete conversion of the raw material to titanium nitride could give a product of value.

Now according to the present invention it has been found that it is not necessary to effect complete conversion of Ti to TiN when a pigment of discrete golden flakes is desired. On the contrary, it has been found that such a pigment, of exceedingly pleasing appearance and excellent quality, is produced by nitridizing titanium flakes of a critical thickness to a chemically combined nitrogen content of only about from 12 to 20% by weight —that is, about from 55 to 90% of theoretically complete conversion to TiN, provided that during the nitridation reaction the temperature is controlled within the range of 1000 to 1100° C. One possible explanation for the desirable results achieved is that control of the reaction temperature avoids incipient sintering of the flakes and permits the formation of composite flakes consisting of a coating or envelope of titanium nitride, TiN, on a core of less highly nitridized titanium, but the invention is not to be construed as limited by this or any other explanation except as set forth in the appended claims.

The novel processes of this invention can also be employed to advantage in the production of completely nitridized titanium flakes and in this respect the processes provide an improved method for making the titanium nitride products described in the above-mentioned Niederhauser patent application.

The novel golden flake pigments of the invention, when dispersed in a suitable film-forming vehicle, give coating compositions capable of producing films of unusually lustrous, gold color and hence have great value in paints and lacquers.

THE FLAKE TITANIUM STARTING MATERIAL

The flake titanium used as a starting material in a process of the present invention can be prepared by any desired method provided the method is capable of giving flakes having a final thickenss of from 0.1 to 3.0 microns. The term "flake" is used herein in its ordinary meaning to refer to a thin, scale-like layer or chiplike piece, the length and width each being several times the thickness. In a preferred embodiment the length and width are each in the range of 20 to 100 microns, the thickness being 0.1 to 3.0 microns. Conventional methods are often sufficient to produce titanium flakes in this desired range.

One very old process involves a stamping operation, usually carried on in dry form but also conducted in the presence of liquids. A modification of this process involves the use of ball mills with dry metal powders. Another process involves the preparation of flakes by ball milling operations in the presence of inert liquids, usually of a hydrocarbon nature. Various modifications of the latter process involve the use of addition agents to promote improved leafing or improved stability of the product in paste form or both. While much of the prior art in this field relates to the preparation of aluminum flake pigments it is readily adaptable to the production of titanium flakes also.

In particular, Hall U.S. Patent 1,569,484 describes the preparation of metal powders and flakes by ball milling in the presence of a vaporizable liquid. The liquid used must be inert to the metal and to the mill. Hall U.S. Patent 2,002,891 describes the addition of a leafing agent such as stearic acid to a process which is otherwise quite similar to that of the prior Hall patent. The techniques described in these patents can be readily adapted by those skilled in the art to the production of titanium flakes.

In considering the suitability of flake titanium for use in a method of this invention the thickness of the flake is, of course, the critical factor. The measurement of the thickness of flake pigments by direct visual means is very difficult because of their tendency to lie flat, making the edges substantially invisible in microscopic examination. However, this tendency to lie flat is used in another way in a method of measuring thickness which has become the acceptable method of measuring this property in the manufacture of aluminum flake pigments. When such flakes are coated with a layer of a fatty acid, such as stearic acid, by wetting with a dilute solution of the acid in a volatile solvent, such as alcohol, and the dry flakes are carefully dusted onto the surface of pure water, they tend to lie flat and to form a monolayer. By careful manipulation of the film, a monolayer free of wrinkling is formed and its area accurately measured. If the weight of the flake pigment used and its specific gravity are known, the average thickness of the film may be readily calculated as follows:

$$\text{Thickness (in microns)} = \frac{\text{weight (in grams)} \times 10{,}000}{\text{area (in cm.}^2 \times \text{sp. g.)}}$$

Thus, a covering area of 2000 square centimeters per gram of titanium metal flake (sp. g. 4.5) corresponds to a thickness of 1.1 microns.

A practicable procedure which is peculiarly adapted to give titanium flakes especially suitable for nitridation according to this invention, and which is therefore generally preferred, is as follows: Pulverized titanium metal sponge, most of which is in the particle size range which will pass through a 14-mesh (U.S. Standard Sieve Size) screen and will be retained on a 200-mesh screen, is charged to a ball mill with a sufficient amount of a liquid, such as mineral spirits, to maintain a fluid suspension in the mill, and with about 2–4% of a fatty acid based on the metal charged to the mill. The mill may conveniently use steel balls in the range of about ¼" to ½" in diameter as the grinding medium, and it should be operated for about 15 hours at close to critical speed, but otherwise the conditions for this ball mill operation are conventional. After the milling is accomplished, the suspension is discharged from the liquid milling medium by decantation or filtration. The fatty acid is substantially removed from the flakes by repeated washing with fresh mineral spirits, and the flakes are finally dried in the absence of oxygen, preferably in a vacuum oven from which all oxygen has been purged by the passage of a stream of nitrogen.

A specific method, hereinafter referred to as "Procedure A," which is based on the foregoing general method, is given below, all parts being by weight.

*Procedure A.*—One thousand parts of ⅜" steel balls are charged to a ball mill of such a size that the balls occupy approximately 40% of its volume. The mill is then charged with 26 parts of titanium powder which has been passed through a standard 30-mesh screen and has a Brinell hardness number of 208, together with 55.5 parts of mineral spirits and 1 part of oleic acid. The mill is then rotated for 15 hours at 93% of critical speed (that speed at which centrifugal force just prevents the balls from dropping as the mill rotates) and the charge is flushed from the mill with several small washes of mineral spirits, filtered and washed with mineral spirits until the filtrate is clear, and finally dried in a vacuum oven until free of solvent. The resulting material is composed of thin flakes exhibiting a covering area on water of about 2000 square centimeters per gram, equivalent to an average thickness of 1.1 microns. On examination of a typical charge for the size of the flakes by screening, 17% remains on a 100-mesh screen, 20% passes a 100-mesh screen but remains on a 200-mesh screen while 63% goes through the 200-mesh screen. Thus, the major portion has at least one of the dimensions of length and width below about 75 microns.

Regardless of the method by which it has been prepared, the subsequent nitridation step requires that the titanium flake have an average thickness in the range of 0.1 to 3.0 microns and preferably less than about 1.5 microns. The dimensions of length and width should be several times the thickness and preferably in the average range of 20 to 100 microns. It is desirable that a major portion should pass through a 200-mesh screen (74 microns) and that a significant amount, say up to about 20%, should pass through a 325-mesh screen (44 microns). Some latitude in the dimensions of length and breadth is possible, especially when complete nitridation is contemplated, since the brittleness of the ultimate titanium nitride will permit some particle reduction to meet the desired dimensions of the final product. However, it is not possible to significantly alter the thickness of the ultimate product flakes once they are formed.

For best results, it is also desirable that the metal flakes be substantially free of any organic material before they are introduced into the high-temperature nitridating operation.

EFFECTING THE NITRIDATION

To effect the nitridation reaction the titanium flakes, selected as above described, are brought into contact with nitrogen gas at a temperature in the range of 1000 to 1100° C. The order of contact and heating is immaterial, and it will be understood that the contact can first be effected and then the temperature can be elevated to the desired range, or one or the other or both of the reactants can be preheated to the desired temperature before effecting the contact. The order used will often be related to and dictated by the manner of maintaining the reacting mass within the critical temperature range as hereinafter described.

The conditions within the reaction zone require the absence of oxygen and water vapor, either of which would react with hot titanium metal before the nitrogen would react. The means by which these foreign gases are removed are not critical. In a batch operation, it is convenient to evacuate the chamber and then to release the vacuum with pure nitrogen. Repetition of such an operation two or three times is an effective means of accomplishing the desired end.

When the reaction is conducted in such a chamber as a continuous kiln, where it is not possible to vary the pressure to any great extent either above or below the atmospheric pressure, this purging of unwanted reactive gases can be accomplished by continuously passing pure nitrogen gas through the reaction chamber for a suitable period of time prior to heating. Once the desired freedom from reactive contaminants in the reaction zone has been achieved, it is necessary to provide an adequate supply of nitrogen at slightly above atmospheric pressure to insure proper continuation of the reaction. If the supply of nitrogen is deficient, the reaction can produce a vacuum with the possibility, especially in the continuous process, of drawing air into the reaction chamber and consequently contaminating the product. The means of maintaining the supply of nitrogen is conventional and will be readily evident to those skilled in the art.

CONTROLLING THE REACTION TEMPERATURE

Control of the reaction temperature within the specified range is critically important if the desired product is to be obtained. Below 1000° C., a degree of reaction occurs above about 850° C. but insufficient nitrogen is combined with the titanium to give a product of the desired minimum of 12% combined nitrogen content. Above 1100° C., the reaction proceeds at an uncontrolled rate, with incandescence and fusion of the product. Within the range of 1000 to 1100° C. the reaction proceeds quietly, and up to complete nitridation of the titanium flakes occurs, surprisingly without change of physical size or shape.

The control of temperature is not merely a matter of supplying a required amount of heat to maintain the desired temperature in the reaction zone. On the contrary, the reaction is violently exothermic and once initiated, ends quickly to get out of hand. In the experimental work which led to the present invention it was observed that unless special precautions were taken it was virtually impossible to avoid local overheating with consequent sintering and fusion of the product, with the result that the desired flake-like character and discrete nature of the product particles was lost. By limiting the amount of titanium flakes in the reaction zone to a very small quantity it was possible to hold the temperature within the stipulated range and produce very limited quantities of the pigment, but as a practical matter certain other expedients were found to be distinctly preferable for moderating the reaction.

One preferred moderating method comprises mixing a substantial amount of an inert, high-melting solid material with the titanium flakes prior to effecting the reaction with the nitrogen. The inert solid acts as a "heat sink" to take up excessive evolved heat. It also maintains some physical separation of the reactive metal flakes into small units, if not into individual flakes. In one specific embodiment of this moderating method titanium metal flakes of suitable dimensions and small steel balls (about ¼" diameter) are mixed in a ratio of at least 4 to 5 parts by weight of steel balls to one part of titanium flakes by charging alternate layers of flakes and balls to a suitable boat which is then inserted into a furnace where it is heated to about 1050° C. in a nitrogen atmosphere.

In the absence of the steel balls heating of the titanium flakes in this manner results in a reaction rate that causes incandescence and fusion with loss of flake-like character of the solid. The presence of the steel balls, on the other hand, reduces the violent character of the reaction and eliminates the incandescence and fusion so that the final product retains the desired flake-like physical form.

In another specific embodiment, a more finely divided inert material, such as 20-mesh silica sand, is mixed with the titanium flakes and the reaction is carried out by continuously passing the mixture through a heating zone in any convenient manner such as through a heated rotating kiln.

Other specific diluents include fine steel shot (0.5 mm. diameter or less), similar-sized shot of other materials such as nickel, carborundum (silicon carbide), or the like. The only limiting factor in the nature of the material is that it be inert both to hot titanium metal and to hot nitrogen gas.

The particle size of diluent is limited on the small side by the necessity that it be easily removable by screening. On the large side two factors need to be taken into account. Larger particles of inert material tend to classify in a rotating kiln so that that rate of transport differs radically from that of titanium flakes. Furthermore, if the inert material is too large, it tends to generate a grinding action so some of the flakes are reduced to powder. For practical purposes, especially when the reaction is carried out in a rotating kiln, the inert material should be in the range of about from 0.5 mm. (approximately 40 mesh) to about 3 mm. (approximately 5 mesh).

In a continuous process employing a solid inert material as a heat sink, such as may be carried out in an inclined rotating kiln for instance, two factors further facilitate proper control of the reaction temperature. These are (1) transport of the titanium metal into the heated zone, through the heated zone, and out of the heated zone, and (2) agitation of the reacting metal while in the heated zone. Both of these factors can be adjusted to optimums for controlling the rate of heat dissipation. The reacting material is agitated as it is carried up the sides of the kiln and falls back during rotation. By installing lifter bars on the interior of the kiln, greater agitation is obtained and similarly, increasing the speed of rotation increases the agitation and separation of the metal flakes from each other and thus improves their contact with the hot gas. The inclination of the rotating kiln promotes transport of the reacting material through the heated zone, the greater the inclination or slope, the more rapid the rate of transport and the shorter the retention time. By adjusting these conditions suitably, the conditions within the reaction zone itself can be homogenized so that the tendency toward local overheating is minimized.

It will be seen that, when using a rotating kiln as the reaction vessel, the amount of material in the reaction zone at any given time is a function of the depth of the bed and this in turn is controlled by a combination of the rate of feed and rate of transport. Thus, it will be understood that a continuous process using a rotating kiln is somewhat sensitive to variations in feed rate since there comes a period where some sintering takes place with loss of flake-like properties. In this event, the rate of feed is slackened until the sintering is eliminated. Likewise, significantly reduced amounts of inert solid diluent may also result in some sintering, but this can be avoided by increasing the amount of diluent. It has been found that in a particular reactor a mixture containing 11% by weight of titanium and 89% by weight of sand provides a suitable feed and that when the proportion of sand in this reactor falls below 85% some sintering may occur. On the other hand, larger amounts of inert diluent results in reducing the capacity of the equipment but are otherwise not harmful.

In practical rotating kilns, gas-tight seals are difficult to attain and are not usually operable at pressures which vary widely in either direction from that of the surrounding atmosphere. To insure freedom from gas contamination the pressure should be slightly above that of atmospheric at all times. Under these conditions, freedom from contaminating gas is best obtained by continuous passage of the desired nitrogen gas through the vessel. It is especially important that this feed be continuous and in ample supply to avoid insufficiency at any time. It is also desirable that the titanium metal flake be free of contaminating gases, but the means by which this is accomplished may be conventional. It is further necessary that the charging port and the discharging port of the kiln embody air locks of such a nature that there is no introduction of air through these openings while the reaction is proceeding. Such devices are well known and conventional.

The "heat sink" principle can also be embodied in a batch process. In this method a conventional boat, of an inert material such as stainless steel, is charged with a mixture of metal flakes and steel balls and placed in a silica tube in a conventional electric furnace. Steel balls ¼" in diameter have proved very satisfactory to use because of their inertness, their high heat capacity and their ease of separation from the product. However, neither the dimensions of the balls nor the nature of the material are critical providing they are essentially inert under the conditions prevailing in the nitridation reaction and are uniformly mixed with the titanium flakes. Other metals can be used, for example nickel or even titanium. In the latter case the formation of a thin, adherent layer of titanium nitride prevents further reaction and leaves the material inert for all practical purposes. Other inert materials include silicon carbide, titanium carbide, gravel, coarse sand, and other ceramic materials.

In another embodiment of this invention control of the reaction temperature is effected by mixing with the flake titanium starting material a portion of titanium nitride flakes. Obviously, this is most feasibly done by recycling a portion of the reaction product, although it will be understood that the material recycled can be incompletely nitridized. It will be evident that when the recycled material is incapable of further nitridation such material is equivalent to the inert solid material employed in the "heat sink" method already described above.

In the practice of this particular mode of moderating the reaction it has been found that there is sometimes achieved an additional advantage in re-exposing the titanium nitride to the reaction conditions because a slight increase in the nitrogen content is thereby obtained.

On the other hand, the extent of this further reaction is so small, as compared to the original reaction, that heat evolution due to the exothermic nature of the reaction is no longer a problem. Maximum effectiveness with a minimum amount of recirculated material is achieved by cooling the reaction product before mixing it with the unreacted titanium flakes.

The proportion of titanium nitride flakes to titanium flakes can be considerably varied, depending on such factors as the temperature of the titanium nitride flakes, just mentioned, and the rate of through-put in the reaction zone. Usually a ratio of about from 1:1 to 5:1 is advantageous, from 2:1 to 4:1 is preferred, while 3:1 is the optimum.

The general considerations already mentioned with respect to other inert diluent materials apply also when titanium nitride is used as the diluent. The titanium nitride flakes appear to be particularly effective in preventing agglomeration of the reacting titanium flakes.

When carrying out this particular embodiment of the invention as a continuous process in a rotating kiln, the depth of the bed or reactants and the degree of agitation of the bed appear to be interrelated, since the greater agitation with a higher speed of rotation and the use of lifter bars enables the use of a deeper bed. In a simple rotating kiln the bed should not exceed about ¼" in depth with somewhat less than this being generally preferred, using speeds of rotation in the range of 2 to 10 revolutions per minute. However, when lifter bars are installed and the speed is increased to 30 to 50 r.p.m., or even higher, the bed depth may then be increased to ½" or even 1". These conditions will obviously be somewhat influenced by the other dimensions of the kiln, these figures having reference to a 6"-diameter kiln. The maximum bed depth should not exceed about 10 to 20% of the diameter of the kiln and for most purposes should not be more than 5 to 10% of this diameter. In such a continuous process the retention time in the heated zone requires a minimum of about two minutes for an acceptable degree of reaction and times up to as much as 10 or 15 minutes are frequently desirable. To extend the time beyond about 15 minutes does not appear to offer any advantage.

The mechanical conditions controlling these variables include the rate of feed, the rate of rotation, and the slope of the kiln. These conditions are important only in so far as they influence the related variables of bed depth, agitation, and rentention time. It is obvious that the retention time can also be influenced by the length of the heated zone. Thus, by using a longer heated zone, the material may be moved through the zone at a higher rate of speed but with the same over-all retention time.

In another embodiment of the present invention the reaction of nitrogen and the titanium flakes is moderated so that the temperature can be controlled within the specified temperature range of 1000 to 1100° C. by mixing with the nitrogen an appreciable portion of an inert gas such as argon or helium.

In employing this inert gas dilution method for moderating the reaction it will be evident to those skilled in the art that the considerations already disclosed above with respect to the manner of carrying out the reaction will also apply. Moreover, the inert gas dilution can be employed in combination with the inert heat sink and the product recycling methods already described.

When the inert gas dilution is employed as the sole means of enabling temperature control of the reaction the proportion of inert gas in the nitrogen atmosphere should be at least about 50% by volume since at proportions less than this the control of reaction rate is largely lost. It is preferred to use a mixture containing from 60 to 80% by volume of the inert gas.

The only requirement as to the nature of the diluent gas is that it be inert under the conditions prevailing in the reaction zone. However, titanium at high temperatures is such a reactive metal that, for practical purposes, argon and helium are the only gases meeting the requirement. They may be used interchangeably on a volume basis.

The manner of operating the process using inert gas dilution is similar to that already described above in connection with other means of moderating the reaction. It will be apparent, therefore, that this embodiment can be used in either a stationary bed reaction or in a continuous, rotating kiln reaction.

In another embodiment of this invention the reaction between nitrogen and titanium flakes is moderated by carrying out the reaction in two stages, the first stage being conducted at 500 to 800° C. and the final stage being effected at 1000 to 1100° C. It has been found that thin titanium flakes react with nitrogen at 500 to 800° C. without significant development of exothermic character to give a product containing a relatively small amount of nitrogen. When this product is heated to a higher temperature in nitrogen gas it reacts quietly to give golden yellow titanium nitride flakes without complication by exothermic heat of reaction.

In one embodiment of this method the titanium metal flakes of suitable dimensions are charged to a furnace such as a closed silica tube heated electrically. The atmosphere in the tube is completely displaced with nitrogen (conveniently done by evacuation followed by the addition of nitrogen gas and the operation repeated two or three times to insure the removal of all oxygen and water vapor), a slight positive pressure of nitrogen gas is then maintained within the tube and the contents are gradually heated over a period of about two hours to a temperature of about 600° C. and maintained at this temperature for a period of two hours, maintaining the positive pressure of nitrogen gas throughout.

The charge is then heated slowly to about 1050° C. and maintained at this temperature under positive pressure of nitrogen for about two hours. After cooling, the product is removed from the furnace as a brilliant golden yellow, lustrous, flake-like material of highly desirable properties.

In an alternative procedure, preferred in many ways this method of moderating the reaction can be carried out in a continuous operation wherein the titanium metal flakes are fed continuously in an atmosphere of nitrogen to a kiln, heated to the desired temperature within the range of 500 to 800° C., and the resulting product, while still blanketed with nitrogen, is fed continuously either to a similar but separate kiln heated to the range of 1000 to 1100° C. or to a separate heated zone at this higher temperature in the same kiln.

The general conditions described above are all applicable to the two-stage reaction process with the exception of the reacting temperature. While the first stage is readily carried out at 500 to 800° C. a temperature in the vicinity of 600° C. is especially preferred for this stage. For completion of the reaction the temperature is held at 1000 to 1100° C., preferably in the vicinity of 1050° C. The first stage gives a faintly yellowish product of low nitrogen content. However, this product is so stabilized that it can be reacted at the preferred temperature of about 1050° C. for complete reaction without any tendency to overheat and fuse.

It will be understood that any of the reaction-moderating means above described can be used in combination with this two-stage process, particularly in the second stage but ordinarily no such extraneous means are required to control the temperature within the desired range when the product if first pre-reacted at low temperature as described.

The product of the reaction at 600 to 800° C. has a chemically combined nitrogen content in the range of 6 to 8% by weight and seems to be passivated so that the second stage reaction takes place without any violence. In the second stage, at 1000 to 1100° C., the nitrogen content increases to at least 17 to 19% by weight and can be carried as high as 22.6% which is theoretical for TiN. However, it is not necessary to carry the nitrogen content as high as required for complete conversion since the products with 17 to 19% of chemically combined nitrogen are valuable golden-colored flake pigments.

THE NITRIDIZED TITANIUM FLAKE PIGMENT

One of the surprising aspects of this invention is that by the processes hereinabove described titanium metal flakes of the specified critical thickness can be nitridized to a chemically combined nitrogen content of from 12 to 20% by weight without change in their physical form. The resultant product is in the form of discrete, golden-colored flakes having excellent properties as pigments in spite of the fact that the conversion to titanium nitride is not 100% complete.

A particularly preferred pigment product of the invention, which is readily producible by the processes described, contains from about 18 to 19% of chemically combined nitrogen. Flakes of such an incompletely nitridized product often are less brittle or fragile than when completely nitridized and do not break as easily when screened, classified, or milled into paint or lacquer; hence they retain a higher percentage of metallic luster in the final film of a finish containing them.

The major utility of the product of this invention is as a pigment. In the various uses of flake pigments in the consuming industries, there are rather rigid specifications with respect to the limits of particle size which must be met, although these limits may vary widely in various end uses. For instance, in coating compositions requiring a high gloss, such as in automotive finishes, the flake pigments must be fine enough to pass a 200-mesh screen (at least one dimension less than 74 microns) and it is preferred that a substantial proportion shall pass a 325-mesh screen (44 microns). On the other hand, for some uses such as variety effects in plastic ware, the flakes may be large enough to be individually visible to the unaided eye. It is one of the advantages of this invention that flakes within this wide range can be made at will by properly selecting the metallic titanium flake to be nitridized and then by suitable classification and mild disintegration operations thereafter. It is characteristic that the titanium nitride flakes have substantially the same dimensions as the titanium metal flakes from which they were made. This means, of course, that the thickness of the flakes is always within the critical range of 0.1 to 3.0 microns.

If the product flakes are larger in length and width than is desired, they can be broken up by conventional methods and dry screened to given the desired smaller sizes. This disintegration may be done during the screening operation by brushing or other mild forms of work, or it may be done in a separate disintegration step of sufficiently mild nature. Complete disintegration to a powder is to be rigorously avoided, however, because it has been found that the powder product no longer has the color and brilliance of the flake pigments, being a dull brown powder.

THE NOVEL COATING COMPOSITIONS

Novel coating compositions, from which films can be prepared by such conventional techniques as brushing, spraying, roller-coating, and the like, are prepared by dispersing the novel pigments in a liquid, film-forming vehicle. This vehicle may be linseed oil, an alkyd resin, a lacquer, or any of the other film-forming liquids which are customary in the paint and finishing art. The coating compositions have particular value because they thus provide decorative finishes of particularly pleasing appearance by virtue of the presence therein of the golden flake pigment.

Examples

The invention will be better understood by reference to the following illustrative examples.

EXAMPLE 1

Titanium nitride flakes were prepared by a method wherein titanium metal was first prepared in flake form and was then nitrided directly. The titanium metal in powder form was first milled in a ball mill in an organic liquid, viz., mineral spirits, to give titanium metal flakes about 1 to 2 microns in thickness with the breadth and length in the range of about 20 to 100 microns. These titanium metal flakes were separated from the liquid and dried and then introduced into a suitable furnace from which all oxygen and water vapor were removed. Nitrogen gas was introduced and the charge was cautiously heated to about 1000 to 1050° C. and maintained at that temperature for about two hours. The reaction between the titanium and nitrogen gas is exothermic and to keep the reaction under control and avoid fusion of the flakes during the reaction an inert material, viz., steel shot, was mixed with the titanium flakes to absorb the excess heat and to keep the flakes separated.

After the heating period, the charge was cooled, the flakes were separated from any inert material present and screened to eliminate material outside the desired size range. Titanium nitride flakes were thereby obtained. These flakes were passed through a standard screen having 200 meshes per square inch and retained on a 325-mesh screen. Thus, the approximate dimensions for the flakes were 44 to 74 microns and these dimensions were confirmed by microscopic examination. The thickness of the flake pigment was determined by the method of Edwards and Wray, "Aluminum Paint and Powder," Reinhold, New York, 1955, pages 18 to 22, after first coating the flakes with stearic acid by moistening with a dilute solution of stearic acid by moistening with a dilute solution of stearic acid and alcohol followed by evaporation of the alcohol. By this method the thickness of the flakes was determined to be 1.2 microns. By chemical analysis the flakes were found to contain about 18% nitrogen compared to 22.6% calculated for TiN. They had a golden color.

EXAMPLE 2

This example illustrates the use of an inert solid to moderate the reaction of nitrogen with titanium metal flakes at 1000 to 1100° C. in a batch process.

A stainless steel boat approximately 2.25" outside diameter by 22" long, generally circular in cross section but with the top cut away, is loaded to a 2" depth with 880 grams of ¼"-diameter steel balls and 180 grams of titanium metal flakes as described in Procedure A, above. A piece of wire screen is wedged into each end of the boat to retain the charge, and the balls and flakes are introduced in alternate layers and thoroughly mixed with some tamping so that the flakes fill the interstices between the balls.

The charged boat is then placed in a fused silica tube 2.5" inside diameter x 36" long, mounted in a furnace so that the portion containing the boat is wholly within the heating area of the furnace. One end of the silica tube is sealed and the other end is closed with a stopper containing a tube attached via suitable valves to a vacuum pump and a source of dry nitrogen. The tube is then evacuated and held for about 20 minutes and then the vacuum is released by the introduction of nitrogen gas with which a slight pressure (about 2" of water) is built up. The evacuation and introduction of nitrogen is repeated three times to insure the removal of oxygen and water vapor. The tube is then arranged so that it is maintained under a slight pressure (about 2" of water) of nitrogen with access to a reserve supply of nitrogen under the same pressure. It is then heated over a two-hour period to a temperature of 1010° C. (as measured by thermocouple on the outside of the tube) and held at that temperature for about two hours, maintaining a constant pressure of nitrogen throughout the cycle and through the subsequent cooling period.

When the furnace has reached about room temperature, the boat is removed and the steel shot are separated by screening, leaving the titanium nitride as golden yellow flakes in substantially the same physical size and shape as the original metal flakes, but with the weight increased to about 220 grams, corresponding to about 18.2% nitrogen (theoretical for TiN is 22.6%).

The major part of these flakes will pass through a 200-mesh screen and have dimensions of width and length in the range of about 40 to 75 microns. When tested by covering area on water, the average thickness is about 1 to 1.5 microns. When this flake titanium nitride is dispersed in a lacquer vehicle and the resulting composition sprayed onto a metal surface, a lustrous golden finish is obtained which sparkles brilliantly in the sunlight. On prolonged exposure to the elements, there is substantially no change in color and no evidence of film degradation which can be attributed to the pigment.

EXAMPLE 3

This example illustrates a continuous process employing an inert solid material to moderate the reaction so as to enable control of the temperature within the range of 1000 to 1100° C. Thus, titanium nitride is prepared in a continuous rotating kiln.

The continuous calciner used in this example comprises a rotating tube approximately 6″ in diameter by 84″ long, so arranged that the slope can be varied, the speed of rotation can be varied, and the device can be heated over any desired portion of the tube to temperatures of about 1000 to 1100° C. Furthermore, the kiln is so designed that the atmosphere within the tube can be controlled by maintenance of a slight positive pressure, and both the feeding device and the discharge port operated through air locks to prevent access of air.

With the tube rotating at about 8 r.p.m., the central 36″ of it is heated to a temperature of about 1050° C. and the tube is thoroughly purged of oxygen and water vapor by passing through it dry nitrogen gas under a slight positive pressure. At the same time a mixture of titanium flakes, prepared according to Procedure A, above, and coarse sand, the mixture comprising about 11% by weight of the titanium and 89% sand, is placed in a suitable vessel and purged of oxygen by evacuating and then introducing dry nitrogen gas, repeating the operation three times to insure the removal of the oxygen. The vessel is then attached to the feed port of the calciner and the mixture is introduced at a continuous rate of about 9 gms. per minute with the slope adjusted to give a retention time of about 7 minutes using an atmosphere of nitrogen at all times.

A mixture of sand and golden yellow flakes of titanium nitride is continuously discharged into a vessel containing an atmosphere of nitrogen and allowed to cool before exposing to oxygen in air. The coarse sand is then removed by screening, through a screen of an appropriate mesh size, to give titanium nitride flakes containing about 12.3% nitrogen but similar in color to the product of Example 2.

EXAMPLE 4

This example illustrates a continuous process employing recirculation of titanium nitride flake product to the reaction zone to moderate the reaction and enable the reaction temperature to be held at the desired value. The rotating kiln used in Example 3 is also used in this example.

With the tube rotating at about 8 r.p.m., the central 36″ of it is heated to a temperature of 1050° C. and the whole tube thoroughly purged of oxygen and water vapor by passing through it dry nitrogen gas under a slight positive pressure. At the same time an intimate mixture of about 25% titanium flakes, as obtained from Procedure A, and 75% titanium nitride flakes previously prepared, are placed in a suitable vessel and purged of oxygen by evacuation, followed by the introduction of dry nitrogen, the operation being repeated three times. This vessel is then attached to the feed port of the calciner and the mixture is fed to the furnace at a rate of 10 grams per minute with a retention time of five minutes at a temperature of 1070° C. measured inside the tube, using atmosphere of pure nitrogen. Although these are occasional flashes of incandescence, there is no sintering under these conditions and titanium nitride flakes of a brilliant golden color are discharged into a container blanketed with nitrogen where they are allowed to cool before exposure to the air. These golden yellow flakes have substantially the same size and shape as the original metal flakes.

The major part of these flakes will pass through a 200-mesh screen and have dimensions of width and length in the range of about 40 to 75 microns. When tested by covering area on water, the average thickness is about 1 to 1.5 microns. When this flake titanium nitride is dispersed in a lacquer vehicle and the resulting composition sprayed onto a metal surface, a lustrous golden finish is obtained which sparkles brilliantly in the sunlight. On prolonged exposure to the elements, there is substantially no change in color and no evidence of film degradation which can be attributed to the pigment.

The initial operation under these conditions yields a product containing about 17.5% nitrogen. When a portion of the material, however, is continuously recycled to provide the titanium nitride in the feed, an equilibrium nitrogen content of about 18.5% is soon reached, in every way equivalent to that obtained in a more conventional batch operation.

EXAMPLE 5

Example 4, above, assumes the availability of a supply of titanium nitride flake previously prepared by any available method. Should this not be the case, however, the equipment of Example 4 is used to prepare the initial titanium nitride flakes by introducing to the calciner titanium metal flakes previously purged of oxygen and water vapor in exactly the same manner as the mixture introduced in Example 4, except at an initial rate of about 1 gram per minute. The golden yellow flakes initially discharged are recycled to the charging end of the unit and introduced along with the titanium metal flakes.

The recycle operation must be conducted under a continuous nitrogen blanket and should provide for cooling to below about 500° C. before mixing with titanium metal flakes. Since nothing is being removed at first, the total amount of titanium nitride flakes being recycled increases rapidly. When it has become about three times the amount of titanium metal flakes being fed, the flow of the latter is increased gradually until any desired rate of flow and ratio of titanium metal to titanium nitride are obtained. At this point the discharge flow is divided so that about 25% is removed as finished product and 75% recycled.

Flow rates in this apparatus have been varied widely and it is entirely feasible in a continuous process operating at equilibrium to increase the rate of flow of the titanium metal flakes to about 5 grams per minute or total flow of mixture to about 20 grams per minute, of which 5 grams per minute is removed from the discharge stream and the remainder recycled.

EXAMPLE 6

This example illustrates a process of the invention wherein the reaction is moderated by diluting the nitrogen with argon, whereby control of the temperature within the required range is facilitated. The rotating kiln in Example 3 is also used in this example.

With the tube rotating at about 8 r.p.m., the central 36″ of it is heated to a temperature of 1050° C. and the whole tube thoroughly purged of oxygen and water vapor by passing through it, under a slight positive pressure, a mixture of about 25% nitrogen and 75% argon. At the same time a charge of titanium flakes, as obtained from Procedure A, is placed in a suitable vessel and purged of oxygen by evacuating, followed by the introduction of nitrogen, the operation being repeated three times. This vessel is then attached to the feed port of the calciner and the flakes are introduced at a continuous rate of about 1 gram per minute and the slope adjusted so that the retention time in the heated zone is about 15 minutes, while continuously introducing the mixture of nitrogen and argon and discharging the resulting golden yellow flakes through the discharge port into a vessel containing a nitrogen atmosphere, where it is allowed to cool before exposure to oxygen in the atmosphere.

Although the nitrogen content of these golden yellow flakes is only about 12%, the color and other properties are substantially the same as those of a product with higher nitrogen content prepared in other ways.

These golden yellow flakes of titanium nitride have substantially the same physical size and shape as the original metal flakes, but with the weight increased.

The major part of these flakes will pass through a 200-mesh screen and have dimensions of width and length in the range of about 40 to 75 microns. When tested by covering area on water, the average thickness is about 1 to 1.5 microns. When this flake titanium nitride is dispersed in a lacquer vehicle and the resulting composition sprayed onto a metal surface, a lustrous golden finish is obtained which sparkles brilliantly in the sunlight. On prolonged exposure to the elements, there is substantially no change in color and no evidence of film degradation which can be attributed to the pigment.

Variations in operating conditions affect the results as follows:

(1) Operation at lower temperatures reduces the nitrogen content. Thus, working at 750° C. with other conditions the same gives approximately 8% nitrogen content.

(2) Higher feed rate and reduced retention time in the heating zone also cause lower nitrogen content. Conversely, longer retention time increases the nitrogen content.

EXAMPLE 7

This example illustrates a batch process of this invention wherein the reaction is moderated to facilitate heat control by carrying it out in two stages, the first at 500 to 800° C. and the second at 1000 to 1100° C. The stainless steel boat used in Example 2 is also used in this example.

The boat is loaded to a ½" depth with about 180 grams of titanium metal flakes as obtained in Procedure A. A piece of wire screen is wedged into each end of the boat to retain the charge. The charged boat is then placed in a fused silica tube 2.5" in inside diameter x 36" long, mounted in a furnace so that the portion containing the boat is wholly within the heating area of the furnace. One end of the silica tube is sealed and the other end is closed with a stopper containing a tube attached via suitable valves to a vacuum pump and a source of dry nitrogen. The tube is then evacuated and held for about 20 minutes and then the vacuum is released by the introduction of nitrogen gas with which a slight pressure (about 2" water) is built up. The evacuation and introduction of nitrogen is repeated three times to insure the removal of oxygen and water vapor. The tube is then arranged so that it is maintained under a slight pressure (about 2" water) of nitrogen with access to a reserve supply of nitrogen under the same pressure. It is then heated over a 2-hour period to a temperature of about 600° C. (as measured by a thermocouple on the outside of the tube) and held at that temperature for about 2 hours, maintaining a constant pressure of nitrogen throughout the cycle.

The temperature is then increased over a 1-hour period to about 1050° C. measured in the same way and again held for about 2 hours under a positive pressure of nitrogen which is also maintained through a subsequent cooling to below about 100° C. before removing the boat with its charge of golden yellow flakes of titanium nitride from the tube. These flakes have substantially the same physical size and shape as the original metal flakes but with a substantial increase in weight corresponding to a nitrogen content of about 18%.

The major portion of these flakes will pass through a 200-mesh screen and have dimensions of width and length in the range of about 40 to 75 microns. When tested by covering area on water, the average thickness is about 1 to 1.5 microns. When the titanium nitride flakes are dispersed in a lacquer vehicle and the resulting composition is sprayed onto a metal surface, a lustrous golden finish is obtained which sparkles brilliantly in the sunshine. On prolonged exposure to the elements there is substantially no change in color and no evidence of film degradation which can be attributed to the pigment.

EXAMPLE 8

This example describes a two-stage process of Example 7, carried out as a continuous reaction. The example uses as a reaction vessel the rotating kiln of Example 3.

With the kiln tube rotating slowly and heated to the desired temperature, i.e., about 750° C. in the first step, the tube is thoroughly purged of oxygen and water vapor by prolonged passage through it of dry nitrogen under slight positive pressure. At the same time, a charge of titanium metal flakes, as obtained in Procedure A, is placed in a suitable vessel and purged of oxygen by alternate evacuation and introduction of dry nitrogen, the operation being repeated three times. This vessel is then attached to the feed port of the kiln and the titanium flakes are introduced at a rate of about 1 gram per minute with a retention time in the heated zone of about 7 minutes and with an atmosphere of pure nitrogen in the furnace. The product, after being cooled under nitrogen and discharged from the furnace, is a light gold in color and has a nitrogen content in the range of 8 to 9%. There is no sintering nor firing under these conditions.

The material discharged from this first step, still blanketed with nitrogen, is then fed at the same rate to a second furnace rotating at about 8 r.p.m. and heated to 1070° C. in an atmosphere of nitrogen. There is no sintering nor firing and the brilliant golden flake-like product has the appearance and properties of the product of Example 7.

In carrying out this two-step operation, it is immaterial whether the product is isolated and stored following the first step, whereupon it may be fed back to the same furnace or a different furnace operating under the desired conditions, or whether two furnaces are operated in series with the product passing directly from one to the other without isolation.

As an alternative and somewhat preferred mechanical expedient, the two heating zones may be combined in the same furnace using a rotating tube of such length that the heating zones may be sufficiently separated that the higher temperature will not be carried back to the low temperature zone by conduction and by the heat of reaction.

We claim:

1. In a process for producing a golden-colored pigment in the form of discrete, nitridized titanium flakes having a thickness of from 0.1 to 3.0 microns, the steps comprising (1) effecting contact between nitrogen gas and titanium flakes having a thickness of 0.1 to 3.0 microns while maintaining the temperature in the range from 1000 to 1100° C., whereby nitridation of the titanium by the nitrogen occurs, and (2) continuing such contact until the flakes contain from 12 to 22.6% by weight of chemically combined nitrogen.

2. A process of claim 1 wherein the nitridation reaction is moderated to facilitate maintaining the temperature in the range from 1000 to 1100° C. by mixing a substantial amount of an inert, high-melting solid material with the titanium flakes prior to effecting the nitridation reaction.

3. A process of claim 1 wherein the nitridation reaction is moderated to facilitate maintaining the temperature in the range from 1000 to 1100° C. by mixing with the nitrogen gas, prior to effecting the nitridation reaction, a substantial proportion by volume of an inert gas selected from the group consisting of argon and helium.

4. A process of claim 1 wherein the nitridation reaction is moderated to facilitate maintaining the temperature in the range from 100 to 1100° C. by mixing with the titanium feed flakes, prior to effecting the nitridation reaction, a substantial amount of at least partially nitridized titanium flakes of substantially the same thickness as the said feed flakes.

5. A process of claim 4 wherein the at least partially nitridized titanium flakes mixed with titanium feed flakes are a recycled portion of the reaction product.

6. In a process for producing a golden-colored pigment in the form of discrete, nitridized titanium flakes having a thickness of from 0.1 to 3.0 microns, the steps comprising (1) effecting contact between nitrogen gas and titanium flakes having a thickness of 0.1 to 3.0 microns while maintaining the temperature in the range from 500 to 800° C., whereby partial nitridation of the titanium by the nitrogen occurs, (2) thereafter effecting contact between nitrogen gas and said partially nitridized titanium flakes at a temperature in the range from 1000 to 1100° C., whereby further nitridation of the titanium occurs, and (3) continuing said contact at 1000 to 1100° C. until the flakes contain from 12 to 22.6% by weight of chemically combined nitrogen.

References Cited by the Examiner

UNITED STATES PATENTS 3,032,397  5/62  Niederhauser _____ 106—299

FOREIGN PATENTS 603,282  8/60  Canada.

OTHER REFERENCES

Schwarzkopf et al.: Hard Refractory Metals, The MacMillan Co., New York, 1953, page 229.

TOBIAS E. LEVOW, *Primary Examiner.*

UNITED STATES PATENT OFFICE
CERTIFICATE OF CORRECTION

Patent No. 3,205,084                                September 7, 1965

Oscar J. C. Klein et al.

It is hereby certified that error appears in the above numbered patent requiring correction and that the said Letters Patent should read as corrected below.

Column 15, line 11, for "100" read -- 1000 --.

Signed and sealed this 5th day of April 1966.

(SEAL)
Attest:

ERNEST W. SWIDER                                EDWARD J. BRENNER
Attesting Officer                                   Commissioner of Patents